United States Patent Office 3,412,112
Patented Nov. 19, 1968

3,412,112
3β,10α-17β-TRIOL-GON-4-ENES AND
DERIVATIVES THEREOF
Theodore J. Foell, King of Prussia, Richard W. Rees, Newtown Square, and Herschel Smith, Wayne, Pa., assignors to American Home Products Corporation, New York, N.Y., a corporation of Delaware
No Drawing. Filed Oct. 12, 1966, Ser. No. 586,030
7 Claims. (Cl. 260—397.5)

This invention relates to and has for its objects the provision of new physiologically active compounds, novel processes for their production and new intermediates useful in the preparation thereof.

More particularly, this invention relates to compounds of the Formula I:

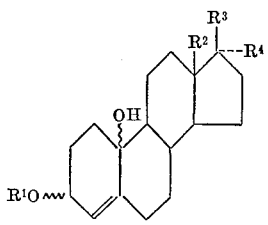

wherein (ƒ) represents the α and β-position; $R^1$ is hydrogen or acyl; $R^2$ is a lower alkyl group of 2 to 4 carbon atoms; $R^3$ is β-hydroxy; $R^4$ is hydrogen, a lower alkyl, lower alkynyl, halo lower alkyl, trifluoromethyl substituted lower alkynyl group, each containing 2 to 4 carbon atoms, or together $R^3$ and $R^4$ is oxo (=O).

Among the suitable acyls may be mentioned the acyl radical of a hydrocarbon carboxylic acid of less than twelve carbon atoms, as exemplified by the lower alkanoic acid (e.g., acetic, propionic, butyric, hexanoic and enanthic acid), the lower alkenoic acids (e.g., acrylic acid), the cycloalkane carboxylic acids (e.g., cyclobutane carboxylic acid), the monocyclic aromatic carboxylic acids (e.g., benzoic), and the monocyclic aryl lower alkanoic acids (e.g., phenacetic and β-phenylpropionic acid).

Among the suitable lower alkynyls may be mentioned ethynyl, propynyl and butynyl. Among the suitable halogen substituted alkynyls may be mentioned fluoroethynyl, chloroethynyl, 1-fluoropropynyl, 1-chloropropynyl, 1-fluorobutynyl, 1-bromobutynyl, and the like. Among the suitable trifluoromethyl substituted lower alkynyls may be mentioned 1-trifluoromethylethynyl, 1-trifluoromethylpropynyl, and the like.

The final products of this invention are physiologically active substances which possess steroidal hormonal activity including progestational, androgenic, and anabolic activity. Hence, the compounds of this invention may be used in lieu of known progestational agents, in the treatment of habitual abortion or in lieu of testosterone propionate as an anabolic agent.

The compounds may be formulated for such administration, the concentration and/or dosage being based on the activity of the particular compound and the requirements of the patient.

The compounds of this invention may be prepared according to the process of this invention which may be represented by the following scheme wherein $R^2$, $R^3$ and $R^4$ are as hereinbefore defined:

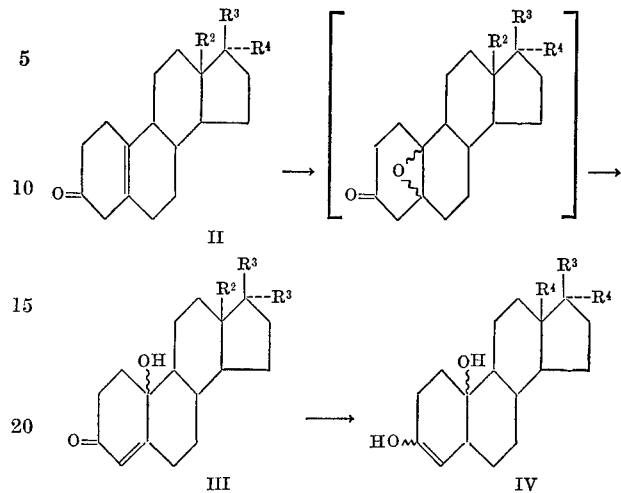

According to a feature of this invention compounds of Formula II are interacted with an organic peracid, such as perbenzoic acid, haloperbenzoic acids (e.g., chloroperbenzoic acids), perphthalic acid, and per(lower alkanoic) acids (e.g., peracetic acid), in an inert organic medium, to yield the 3-keto-10α- and 10β-hydroxy derivatives of Formula III which are the intermediates for the final products of this invention.

The 3-keto steroids of Formula III are then reduced with a reducing agent such as a metal hydride (e.g., lithium aluminum hydride) or an alkali metal borohydride (e.g., sodium borohydride to yield the final products of this invention (compounds of Formula IV).

If a 3-ester is desired as the final product, the corresponding 3-hydroxy compound is reacted with the acyl chloride or acid anhydride of the desired acid, preferably one of the acids mentioned hereinbefore, to yield the 3-ester.

Among the suitable starting steroids which can be made by conventional methods that are utilizable in the process of this invention particularly as disclosed in the Smith et al. publication entitled Totally Synthetic Steroid Hormones, J. Chem. Soc., 4472–4492 (1964) may be mentioned 13-lower alkyl-17α-ethynyl-17β-hydroxygon-5(10)-en-3-one (e.g., 13-ethyl-17α-ethynyl - 17β - hydroxygon-5(10)-en-3-one, 13 - propyl-17α-ethynyl-17β-hydroxygon-5(10)-en-3-one, 13-butyl-17α-ethynyl - 17β - hydroxygon-5(10)-en-3-one); 13-lower alkyl-17 - hydroxygon-5(10)-en-3-one (e.g., 13-ethyl-17β- hydroxygon - 5(10) - en-3-one); 13-lower alkyl-17-lower alkyl - 17 - hydroxygon-5(10)-en-3-one (e.g., 13,17α-diethyl - 17 - hydroxygon-5(10)-en-3-one, 13-propyl-17α-ethyl - 17 - hydroxygon-5(10)-en-3-one); 13-propylgon-5(10)-en-3,17-dione; 13-butylgon-5(10)-en-3,17 - dione; 13-ethyl-17α-ethynyl-17-hydroxygon-5(10)-en-3-one; 13-ethyl-17α - propynyl-17-hydroxygon - 5(10)-en-3-one; 13-butyl - 17α-ethynyl-17-hydroxygon-5(10)-en-3-one; 13-ethyl-17α - chloroethynyl-17β-hydroxygon-5(10)-en-3-one; 13 - ethyl-17α-fluoroethynyl-17β-hydroxygon-5(10)-en-3-one, and the like.

The following examples illustrate the invention (all temperatures being in centigrade):

Example 1.—13β-ethyl-17α-ethynyl-10,17β-dihydroxygon-4-en-3-one

To 4.9 gm. of 13β-ethyl-17α-ethynyl-17-hydroxygon-5(10)-en-3-one dissolved in 100 ml. of a 1:1 mixture of benzene-chloroform is added 3.16 gm. of m-chloroperbenzoic acid. The mixture is stirred for 16 hours at room temperature and then filtered to remove the m-chlorobenzoic acid formed.

The reaction mixture is washed with water and extracted with 0.1 N NaOH until the aqueous wash is basic. The organic phase is then washed with water until neutral and dried over sodium sulfate.

The organic phase is evaporated under vacuum and an oil residue is obtained. The oil is dissolved in 300 ml. of methanol containing 30 gm. of potassium hydroxide and refluxed under nitrogen for one hour. Water is added and the mixture is extracted with chloroform. The chloroform phase is washed with water until neutral and dried over sodium sulfate. The solvent is evaporated under vacuum and an oil is obtained. The oil is triturated with ether to yield 2.12 gm. of crystals. Recrystallization from boiling benzene yields pure 13β-ethyl-17α-ethynyl-10,17β-dihydroxygon-4-en-3-one having a melting point of about 226–229°;

$\lambda_{max.}^{KBr}$ 3.00, 3.12, 6.05, 6.16μ; $\lambda_{max.}^{235}$ (=15,600)

Analysis.—Calcd. for $C_{21}H_{28}O_3 \cdot \frac{1}{2}C_6H_6$: C, 78.44; H, 8.50. Found: C, 78.68; H, 8.89.

Example 2.—13β-propyl-17α-ethynyl-10,17β - dihydroxygon-4-en-3-one

Following the procedure of Example 1, but substituting 13β-propyl-17α-ethynyl-17-hydroxygon-5(10)-en-3-one for 13β-ethyl-17α-ethynyl-17-hydroxygon-5(10)-en-3-one there is obtained 13β-propyl-17α-ethynyl-10,17β-dihydroxygon-4-en-3-one.

Example 3.—13β-ethyl-17α-propynyl-10,17β - dihydroxygon-4-en-3-one

Following the procedure of Example 1, but substituting 13β-ethyl-17α-propynyl-17-hydroxygon-5(10)-en - 3 - one for 13β-ethyl-17α-ethynyl-17-hydroxygon-5(10)-en-3-one there is obtained 13β-ethyl-17α-propynyl - 10,17β - dihydroxygon-4-en-3-one.

Example 4.—13β-ethyl-17α-chloroethynyl-10,17β - dihydroxygon-4-en-3-one

Following the procedure of Example 1, but substituting 13β-ethyl-17α-chloroethynyl-17β-hydroxygon - 5(10) - en-3-one for 13β-ethyl-17α-ethynyl-17-hydroxygon-5(10)-en-3-one there is obtained 13β-ethyl-17α-chloroethynyl-10,17β-dihydroxygon-4-en-3-one.

Example 5.—13β-ethyl-17α-fluoroethynyl-10,17β - dihydroxygon-4-en-3-one

Following the procedure of Example 1, but substituting 13β-ethyl-17α-fluoroethynyl-17β-hydroxygon - 5(10) - en-3-one for 13β-ethyl-17α-ethynyl-17-hydroxygon-5(10)-en-3-one there is obtained 13β-ethyl-17α-fluoroethynyl-10,17β-dihydroxygon-4-en-3-one.

Example 6.—13-ethyl-10(α and β),17β - dihydroxygon-4-en-3-one

To 9.0 gm. of 13-ethyl-17β-hydroxygon-5(10)-en-3-one dissolved in 260 ml. of 10:3 mixture of benzene-chloroform is added 5.9 gm. of m-chloroperbenzoic acid. The mixture is stirred at room temperature for 30 hours and an amorphous solid precipitates from the mixture. The solid is recrystallized from a mixture of chloroform benzene to yield pure 13-ethyl-10α,17β-dihydroxygon-4-en-3-one having a melting point of 178°–182°;

$\lambda_{max.}^{KBr}$ 3.0, 3.5 and 3.05μ; $\lambda_{max.}^{EtOH}$ 237 mμ ($\epsilon = 17,700$)

Analysis.—Calcd. for $C_{19}H_{28}O_3$: C, 74.96; H, 9.27. Found: C, 74.81; H, 9.46.

The filtrate from the reaction mixture is diluted with ether, washed with a potassium carbonate solution, then with water and dried with sodium sulfate. The solvent is evaporated under vacuum and an amorphous solid is obtained. The solid is recrystallized from ethyl acetate to yield the 10-epimer of the above compound having a melting point of 247–250°, $\lambda_{max.}^{KBr}$ 3.0, 3.5 and 6.05μ; $\lambda_{max.}^{EtOH}$ 235 mμ ($\epsilon = 13,200$)

Analysis.—Calcd. for $C_{19}H_{28}O_3$: C, 74.96; H, 9.27. Found: C, 74.96; H, 9.18.

Example 7.—13-butyl-10,17β - dihydroxygon-4-en-3-one

Following the procedure of Example 6 but substituting 13-butyl-17β-hydroxygon-5(10)-en-3-one for 13 - ethyl-17β-hydroxygon-5(10)-en-3-one there is obtained 13-butyl-10,17β-dihydroxygon-4-en-3-one.

Example 8.—13-ethyl-10-hydroxygon - 4 - en-3,17-dione

To 7.0 gm. of 13-ethylgon-5(10)-en - 3,17 - dione dissolved in 200 ml. of a 10:3 mixture of benzene-chloroform is added 4.6 gm. of m-chloroperbenzoic acid. The mixture is stirred at room temperature for 30 hours and a solid precipitates from the mixture. The solid is filtered and suspended in 500 ml. of t-butanol. 3.0 gm. of sodium carbonate in 90 ml. of water is added to the suspension. The suspension is refluxed 1.5 hours, poured into water and extracted with a 1:1 mixture of ether-benzene. The organic layer is washed with water, dried over sodium sulfate and evaporated under vacuum. The residue is crystallized from benzene to yield 13-ethyl-10-hydroxygon-4-en-3,17-dione having a melting point of 213–218°.

$\lambda_{max.}^{KBr}$ 2.95, 3.45, 5.78μ; $\lambda_{max.}^{EtOH}$ 238 mμ ($\epsilon = 13,600$)

Example 9.—13,17α-diethyl-10(ξ),17-dihydroxygon-4-en-3-one 10.0 gm. of 13,17α-diethyl-17-hydroxygon-5(10)-en-3-one is added quickly to a solution of 6.0 gm. of m-chloroperbenzoic acid in 200 ml. of benzene. The mixture is stirred 15 minutes at room temperature, poured into a saturated sodium bicarbonate solution and extracted with ether. The organic extract is washed with a sodium bicarbonate solution, water and then dried over sodium sulfate. The solvent is evaporated, the residue is dissolved in 200 ml. of solution of benzene with 2.0 gm. of m-chlorobenzoic acid and refluxed for 24 hours. The solution is then washed with a saturated sodium bicarbonate solution, brine and then dried over sodium sulfate.

The solvent is evaporated under vacuum and the solid residue is triturated with ethyl acetate to yield 13,17-α-diethyl-10(ξ),17-dihydroxygon-4-en-3-one having a melting point of 220–223°, $\lambda_{max.}^{EtOH}$ 236 mμ ($\epsilon = 15,200$), $\lambda_{max.}^{KBr}$ 2.95, 3.07, 6.03 10.60 and 10.75μ

Analysis.—Calcd. for $C_{21}H_{32}O_3$: C, 75.86; H, 9.70. Found: C, 76.08; H, 9.48.

The mother liquors are evaporated to dryness and the residue is crystallized from benzene to yield 13,17-α- diethyl-10(ξ),17-dihydroxygon - 4-en-3-one having a melting point of 112–118°, $\lambda_{max.}^{KBr}$ 3.02 and 602μ; $\lambda_{max.}^{EtOH}$ 237 mμ ($\epsilon = 13,700$)

Analysis.—Calcd. for $C_{21}H_{32}O_2 \cdot \frac{1}{6}C_6H_6$: C, 76.48; H, 9.63. Found: C, 76.57; H, 9.50.

Example 10.—13,17α-dipropyl-17-dihydroxygon-4-en - 3-one

Following the procedure of Example 9 but substituting 13,17α-dipropyl-17-hydroxygon-5(10)-en-3-one for 13, 17α-diethyl-17-hydroxygon-5(10)-en-3-one there is obtained 13,17α-dipropyl-10,17-dihydroxygon-4-en-3-one.

Example 11.—13-ethyl-17α-propyl-10,17 - dihydroxygon-4-en-3-one

Following the procedure of Example 9, but substituting 13-ethyl-17α-propyl-17-hydroxygon-5(10)-en - 3 - one less for 13,17α-diethyl-17-hydroxygon-5(10)-en-3-one there is obtained 13-ethyl-17α-propyl-10,17-dihydroxygon-4-en-3-one.

Example 12.—13-ethyl-17α-butyl-10,17-dihydroxygon-4-en-3-one

Following the procedure of Example 9 but substituting 13-ethyl-17α-butyl-17-hydroxygon-5(10)-en-3-one for 13, 17α-diethyl-17-hydroxygon-5(10)-en-3-one there is obtained 13-ethyl-17α-butyl-10,17-dihydroxygon-4-en-3-one.

Example 13.—13β-ethyl-17α-ethynylgon-4-en-3,10,17β-triol 160 mg. of sodium borohydride in 25 ml. of methanol is added to 2.0 gm. of 13β-ethyl-17α-ethynyl-10,17β-dihydroxygon-4-en-3-one dissolved in 100 ml. of methanol. The mixture is stirred at room temperature for one hour. Water is added and the methanol is removed by evaporation under vacuum. The aqueous material is extracted with ethyl acetate, washed with water and dried over sodium sulfate. The solvent is evaporated under vacuum and the residue is recrystallized from chloroform to yield 90 mg. of 13-ethyl-17α-ethynylgon-4-en-3,10,17β-triol having a melting point of 224–228°.

$\lambda^{KBr}_{max.}$ 2.98, 3.45, 3.50μ

Analysis.—Calcd. for $C_{21}H_{30}O_3 \cdot \frac{1}{20}CHCl_3$: C, 75.15; H, 9.00. Found: C, 74.73; H, 8.56.

Example 14.—13,17α-diethylgon-4-en-3,10,17-triol

To 0.5 gm. of 13,17α-diethyl-10,17-dihydroxygon-4-en-3-one dissolved in 50 ml. of methanol is added an excess of sodium borohydride. The mixture is stirred for 2 hours at room temperature, poured into water and extracted with ether. The organic layer is washed with water and dried with sodium sulfate. The solvent is removed by evaporation under vacuum and the residue is recrystallized from the acetone to yield 13,17α-diethylgon-4-en-3,10,17-triol having a melting point of 242–250°.

Analysis.—Calcd. for $C_{21}H_{34}O_3 \cdot H_2O$: C, 71.55; H, 10.30. Found: C, 71.73; H, 9.99.

Reduction of the products of Examples 2 to 8 and 10 to 12 with sodium borohydride according to the procedure of Example 14 gives, respectively, the products of the following Examples 15 through 24:

| Example No. | Starting Material is the Product of Example No. | Product |
| --- | --- | --- |
| 15 | 2 | 13β-propyl-17α-ethynylgon-4-en-3,10,17β-triol. |
| 16 | 3 | 13β-ethyl-17α-propynylgon-4-en-3,10,17β-triol. |
| 17 | 4 | 13β-ethyl-17α-chloroethynylgon-4-en-3,10,17β-triol. |
| 18 | 5 | 13β-ethyl-17α-fluoroethynylgon-4-en-3,10,17β-triol. |
| 19 | 6 | 13β-ethyl-3,10-17β-trihydroxygon-4-ene. |
| 20 | 7 | 13β-butyl-3,10,17β-trihydroxygon-4-ene. |
| 21 | 8 | 13β-ethyl-3,10,17β-trihydroxygon-4-ene. |
| 22 | 10 | 13β,17α-dipropyl-4-en-3,10,17-triol. |
| 23 | 11 | 13β-ethyl-17α-propylgon-4-en-3,10,17-triol. |
| 24 | 12 | 13β-ethyl-17α-butylgon-4-en-3,10,17-triol. |

Example 25.—13β-ethyl-17α-ethynyl-3,10,17β-trihydroxygon-4-ene, 3-acetate

A mixture of 50 mg. of 13β-ethyl-17α-ethynyl-3,10,17β-trihydroxygon-4-ene, 2 ml. of dry pyridine and 1 ml. of acetic anhydride is left at room temperature for 16 hours and then evaporated to dryness in vacuo. Crystallization of the residue yields 13β-ethyl-17α-ethynyl-3,10,17β-trihydroxygon-4-ene, 3-acetate.

In a similar manner by substituting any other acid anhydride or acyl chloride for the acetaic anhydride in the procedure of Example 25, the corresponding ester is formed.

Similarly, by following the procedure of Example 25, the hydroxy group in the 3-position of the compounds of Examples 15 through 24 may be converted to their acetate derivatives, however, in Examples 19, 20 and 21, the 3,17-diacetate may be obtained.

The invention may be variously otherwise embodied within the scope of the appended claims.

What is claimed is:

1. A steroid of the formula:

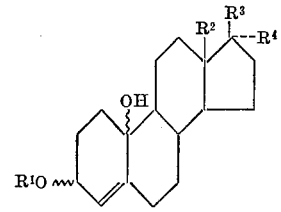

wherein $R^1$ is selected from the group consisting of hydrogen and acyl; $R^2$ is a lower alkyl group of 2 to 4 carbon atoms; $R^3$ is hydroxy; and $R^4$ is selected from the group consisting of hydrogen, lower alkyl, lower alkynyl, halo alkynyl and trifluoromethyl substituted lower alkynyl groups each containing 2 to 4 carbon atoms, and together $R^3$ and $R^4$ is oxo (=O).

2. A steroid according to claim 1 having the formula:

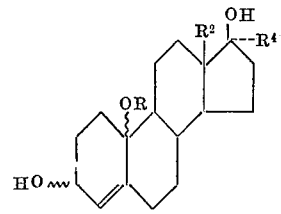

wherein $R^2$ is a lower alkyl group of 2 to 4 carbon atoms and $R^4$ is a lower alkyl group.

3. A steroid according to claim 1 having the formula:

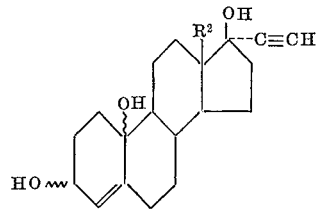

wherein $R^2$ is a lower alkyl group of 2 to 4 carbon atoms.

4. The compound according to claim 1 which comprises 13β-ethyl-17α-ethynylgon-4-en-3β,10α,17β-triol.

5. The compound according to claim 1 which comprises 13β-ethyl-17α-ethynylgon-4-en-3β,10β,17β-triol.

6. The compound according to claim 1 which comprises 13β,17α-diethylgon-4-en-3β,10,17-triol.

7. A process for preparing the steroids of claim 1 wherein $R^1$ is hydrogen which comprises the steps of interacting a steroid of the formula:

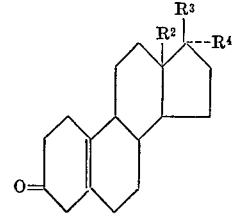

wherein $R^2$, $R^3$ and $R^4$ each has the meaning defined in claim 1, with an organic peracid in an inert medium, thereby forming a compound having the formula:

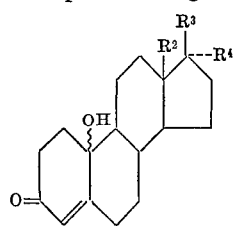

where $R^2$, $R^3$, and $R^4$ have the meanings defined in claim 1, and then reducing the compound formed with a reducing agent selected from the group consisting of a metal hydride and an alkali metal borohydride.

References Cited

UNITED STATES PATENTS 3,231,589   1/1966   Greenspan et al. ___ 260—397.4
3,301,879   1/1967   Wettstein et al. _____ 260—397.5

ELBERT L. ROBERTS, *Primary Examiner.*

UNITED STATES PATENT OFFICE
CERTIFICATE OF CORRECTION

Patent No. 3,412,112                                                      November 19, 196

Theodore J. Foell et al.

It is certified that error appears in the above identified patent and that said Letters Patent are hereby corrected as shown below:

Column 1, line 26, "(∫)" should read -- (ς) --. Column 2, formula IV should appear as shown below:

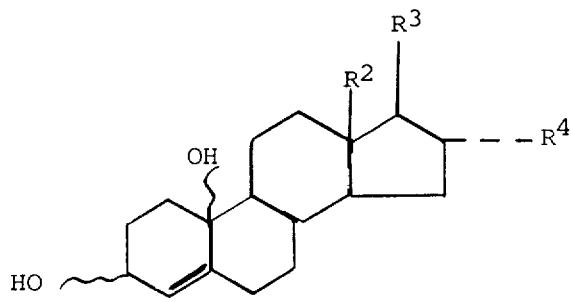

Signed and sealed this 17th day of March 1970.

(SEAL)
Attest:

EDWARD M. FLETCHER, JR.                                   WILLIAM E. SCHUYLER, JR.
Attesting Officer                                                  Commissioner of Patents